(12) United States Patent
Markham

(10) Patent No.: US 11,937,543 B2
(45) Date of Patent: Mar. 26, 2024

(54) BRUSH CUTTER

(71) Applicant: The Modern Group, Ltd., Beaumont, TX (US)

(72) Inventor: Gary Markham, Houston, TX (US)

(73) Assignee: THE MODERN GROUP, LTD., Beaumont, TX (US)

( * ) Notice: Subject to any disclaimer, the term of this patent is extended or adjusted under 35 U.S.C. 154(b) by 733 days.

(21) Appl. No.: 17/143,695

(22) Filed: Jan. 7, 2021

(65) Prior Publication Data

US 2021/0219491 A1   Jul. 22, 2021

Related U.S. Application Data

(60) Provisional application No. 62/962,076, filed on Jan. 16, 2020.

(51) Int. Cl.
| | | |
|---|---|---|
| A01D 34/74 | (2006.01) |
| A01D 34/64 | (2006.01) |
| A01D 34/78 | (2006.01) |
| A01D 34/81 | (2006.01) |

(52) U.S. Cl.
CPC ............. *A01D 34/74* (2013.01); *A01D 34/64* (2013.01); *A01D 34/78* (2013.01); *A01D 34/81* (2013.01)

(58) Field of Classification Search
CPC ................................ A01D 34/74; A01D 34/64
See application file for complete search history.

(56) References Cited

U.S. PATENT DOCUMENTS

| | | | | |
|---|---|---|---|---|
| 3,197,948 A * | 8/1965 | Danford | ............... | A01B 71/06 56/15.8 |
| 3,483,683 A * | 12/1969 | McCanse | ............. | A01D 34/866 56/15.2 |
| 5,005,344 A * | 4/1991 | McCracken | ........... | A01D 34/63 56/14.7 |
| 5,419,014 A * | 5/1995 | Piantedosi | ............. | A47L 13/19 15/104.94 |
| 5,435,117 A * | 7/1995 | Eggena | .................. | A01D 34/64 56/10.2 D |
| 6,662,835 B1 * | 12/2003 | Gengler | ............... | A01G 23/091 144/34.1 |
| 7,418,985 B2 * | 9/2008 | Torgersen | ................ | A01G 3/08 56/235 |
| 9,554,514 B2 * | 1/2017 | Marotte | ............... | A01D 67/005 |
| 10,470,364 B1 * | 11/2019 | Odom | .................. | A01D 34/866 |
| 11,564,356 B2 * | 1/2023 | Grice | ..................... | A01G 3/085 |
| 2021/0227748 A1 * | 7/2021 | Thompson | ........... | A01D 34/866 |

* cited by examiner

*Primary Examiner* — Alicia Torres
(74) *Attorney, Agent, or Firm* — EWING & JONES, PLLC

(57) ABSTRACT

A brush cutter may include a back plate and a spindle arrangement with the spindle arrangement abutting the back plate. The brush cutter may also include an angular arm mechanically formed integrally with or mechanically connected to the spindle arrangement where the angular arm is at angle Θ relative to the back plate. Angle Θ is an acute angle. The brush cutter may also include a mower deck, where the mower deck is mechanically connected to the angular arm and a blade, the blade mechanically connected to the mower deck.

18 Claims, 6 Drawing Sheets

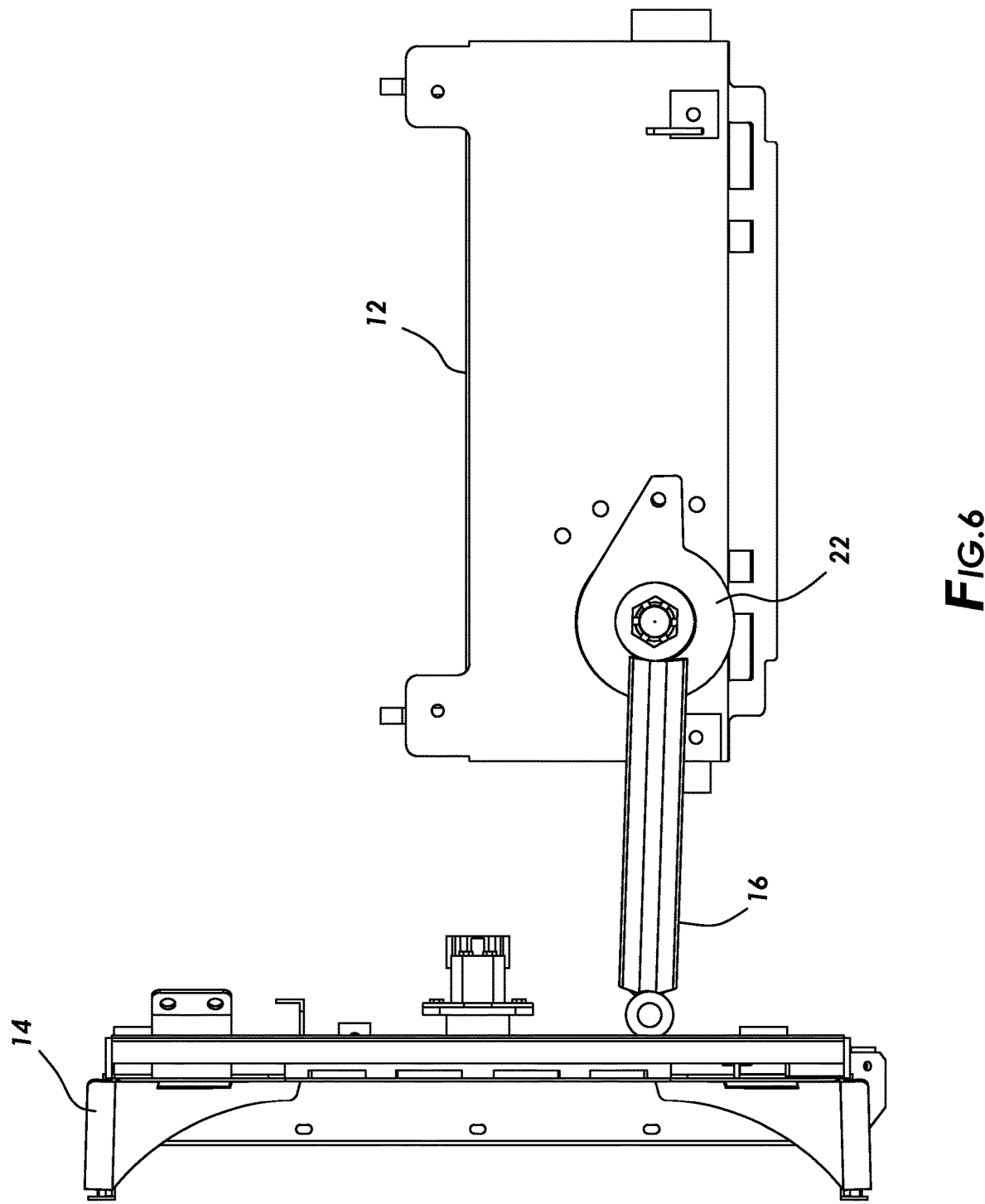

BRUSH CUTTER

CROSS-REFERENCE TO RELATED APPLICATIONS

This application is a nonprovisional application which claims priority from U.S. provisional application No. 62/962,076, filed Jan. 16, 2020, which is incorporated by reference herein in its entirety.

TECHNICAL FIELD/FIELD OF THE DISCLOSURE

The present disclosure relates to apparatus and methods for use in mowing and brush cutting.

BACKGROUND OF THE DISCLOSURE

Traditional mowing and brush cutting equipment typically includes a horizontal or substantially horizontal mower deck, a drive motor, and blade attached thereto. Such traditional mowing and brush cutting equipment may be attached to, for example and without limitation, skid steer tractors or back hoes. While capable of mowing grass and brush extending from the ground, such typical mowing and brush cutting equipment traditionally does not cut vertically extending brush, such as in vertical road and hunting lane cutting, trails, slopes, angled lake sides, retaining pond walls, ditches, or plantation roads, for example. While certain modifications to traditional mowing and brush cutting equipment to permit rotation into planes other than horizontal exist, these modifications suffer from a number of limitations.

SUMMARY

In some embodiments brush cutter is disclosed. The brush cutter may include a back plate and a spindle arrangement with the spindle arrangement abutting the back plate. The brush cutter may also include an angular arm mechanically formed integrally with or mechanically connected to the spindle arrangement where the angular arm is at angle Θ relative to the back plate. Angle Θ is an acute angle. The brush cutter may also include a mower deck, where the mower deck is mechanically connected to the angular arm and a blade, the blade mechanically connected to the mower deck.

In certain embodiments, a method of operating a brush cutter is disclosed. The method may include supplying a brush cutter where the brush cutter may include a back plate, the back plate including a plurality of angular retention devices and a spindle arrangement, the spindle arrangement abutting the back plate. The spindle arrangement includes a retaining plate. The brush cutter may also include an angular arm mechanically formed integrally with or mechanically connected to the spindle arrangement, the angular arm at angle Θ relative to the back plate, wherein angle Θ is an acute angle. In addition, the brush cutter may include a mower deck, the mower deck mechanically connected to the angular arm and a blade, the blade mechanically connected to the mower deck. The method also includes rotating the blade.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 6 is a front elevation view of the brush cutter in a vertically side deployed position.

DETAILED DESCRIPTION

Figure 1:
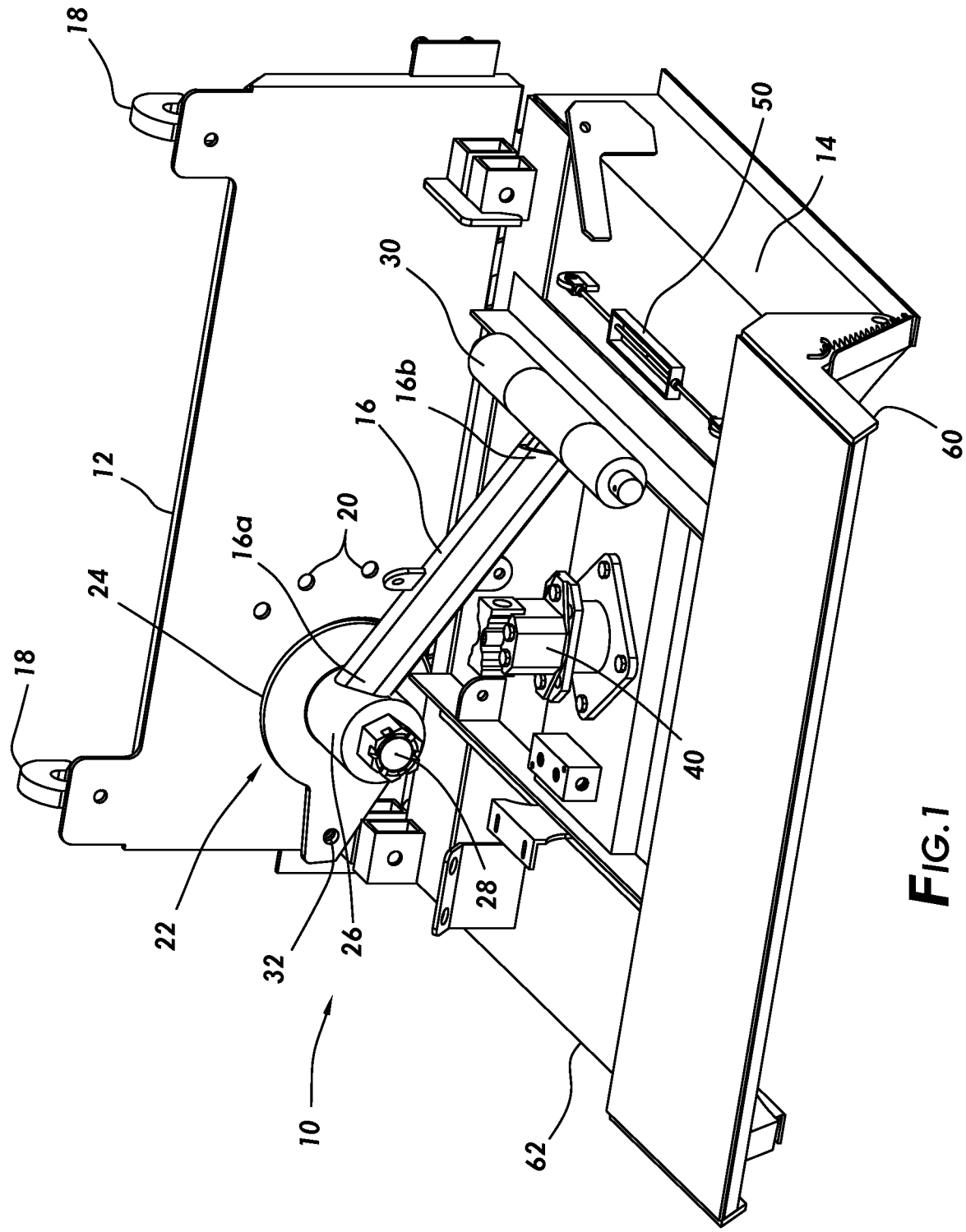
FIG. 1 is an isometric view of a brush cutter in a storage position in accordance with certain embodiments of the present disclosure.
Figure 2:
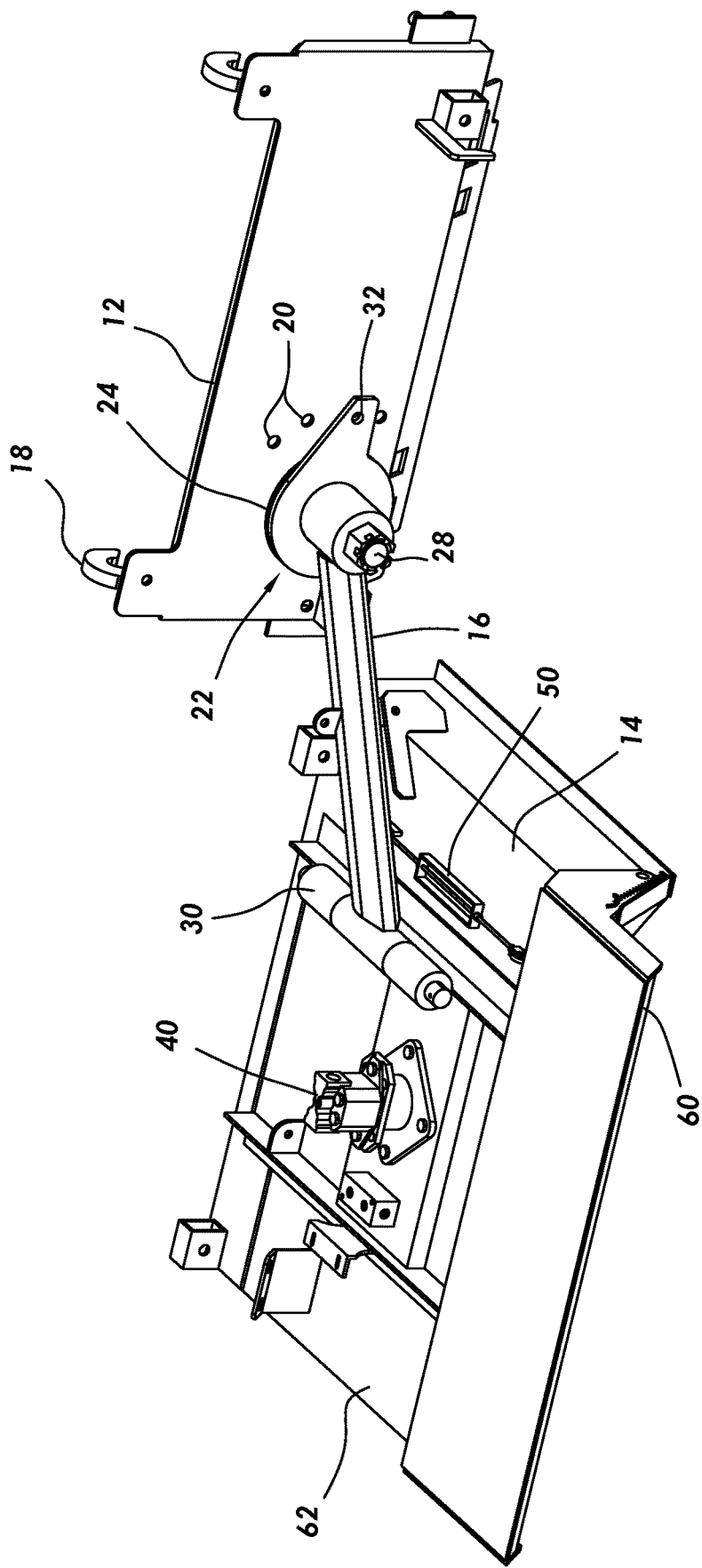
FIG. 2 is an isometric view of the brush cutter of FIG. 1 in a horizontally side deployed position.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an embodiment of brush cutter 10 in a storage position. Brush cutter 10 includes back plate 12 and mower deck 14 connected by angular arm 16. In certain embodiments, back plate 12 includes retention hooks 18 for connecting brush cutter 10 to a vehicle such as, in a non-limiting example, a tractor. Back plate 12 may further include angular position retention devices 20, such as holes or detents, shown in FIG. 1, in a semi-circular arrangement, although other arrangements are contemplated by this disclosure.

FIG. 1 further depicts spindle arrangement 22. Spindle arrangement 22 includes retaining plate 24, which abuts back plate 12. Spindle arrangement 22 includes spindle collar 26, which may be positioned about spindle 28. Spindle 28 may be coupled to back plate 12. Spindle collar 26 may be coupled to spindle 28 such that spindle arrangement 22 is able to rotate relative to back plate 12 about the axis defined by spindle 28. Spindle arrangement 22 may be held at one or more predefined rotational positions with respect to backplate through the use of pin 32, which may be inserted into angular position retention devices 20. Although shown as generally circular, retaining plate 24 may be of any shape. Spindle collar 26 is connected to first end 16a of angular arm 16 such that angular arm 16 and mower deck 14 may be repositioned relative to back plate 12 about the axis defined by spindle 28 by the rotation of spindle collar 26 about spindle 28.

Angular arm 16 may be formed integrally with spindle collar 26 or may be welded or otherwise mechanically connected to spindle collar 26. Angular arm 16 may be connected to mower deck 14 through hinge 30 at second end 16b of angular arm 16. Hinge 30 may allow rotation of mower deck 14 with respect to angular arm 16 about the axis defined by hinge 30. Angular arm 16 may be formed integrally with hinge 30 or may be welded or otherwise connected to hinge 30. In certain embodiments, hinge 30 may allow increased control and balance of mower deck 14 and additional strength of connection compared to other arrangements, such as cantilevered arrangements.

Figure 5:
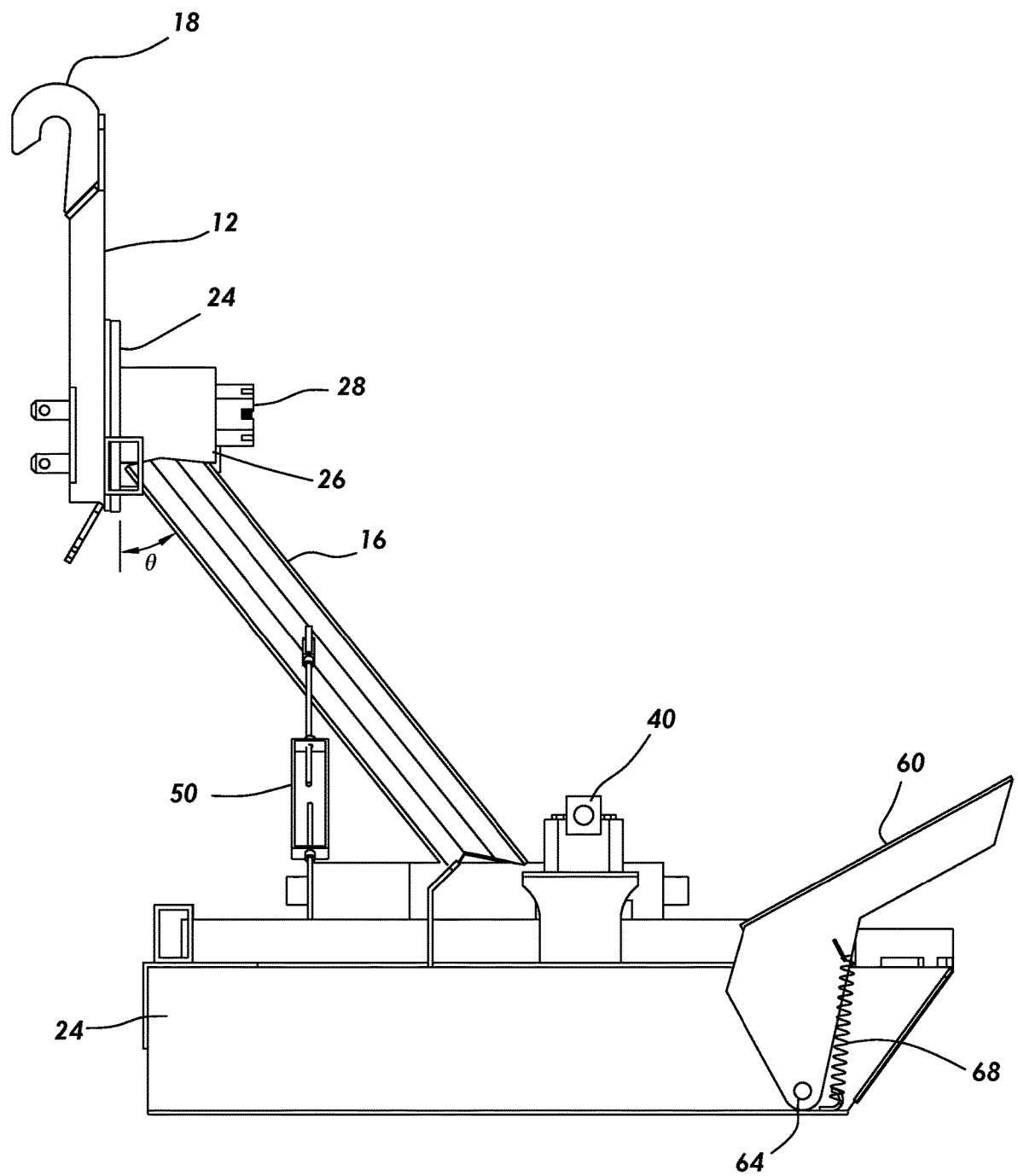
FIG. 5 is a side view of the brush cutter of FIG. 4 in a horizontally low deployed position.

As shown in FIG. 5, in certain embodiments, angular arm 16 may extend from spindle collar 26 at angle —. For the purposes of this disclosure, Angle /Theta/ is defined as extending between the plane of back plate 12 and the longitudinal extent of angular arm 16. Angle Θ is an acute angle and may range from 15-75° or from 30-60° or may be about 45°. Positioning angular arm 16 at angle Θ from spindle collar 26 allows hinge 30 to be positioned on mower deck 14 at a location away from back plate 12 and more towards the center of mass of mower deck 14 than if angular arm 16 was not angled with respect to spindle collar 26. In certain embodiments, the location of hinge 30 at such a position may increase control and balance of mower deck 14 as compared to an arrangement where angular arm 16 is not angled with respect to spindle collar 26. Additionally, locating hinge 30 closer to the middle of mower deck 14 may reduce bending stresses on angular arm 16 and mower deck 14 as compared with a cantilevered arm arrangement in which the mower deck is coupled to a non-angled arm at an edge of the mower deck. In certain embodiments, angle Θ is fixed. In other embodiments, angle Θ may be adjustable.

Figure 4:
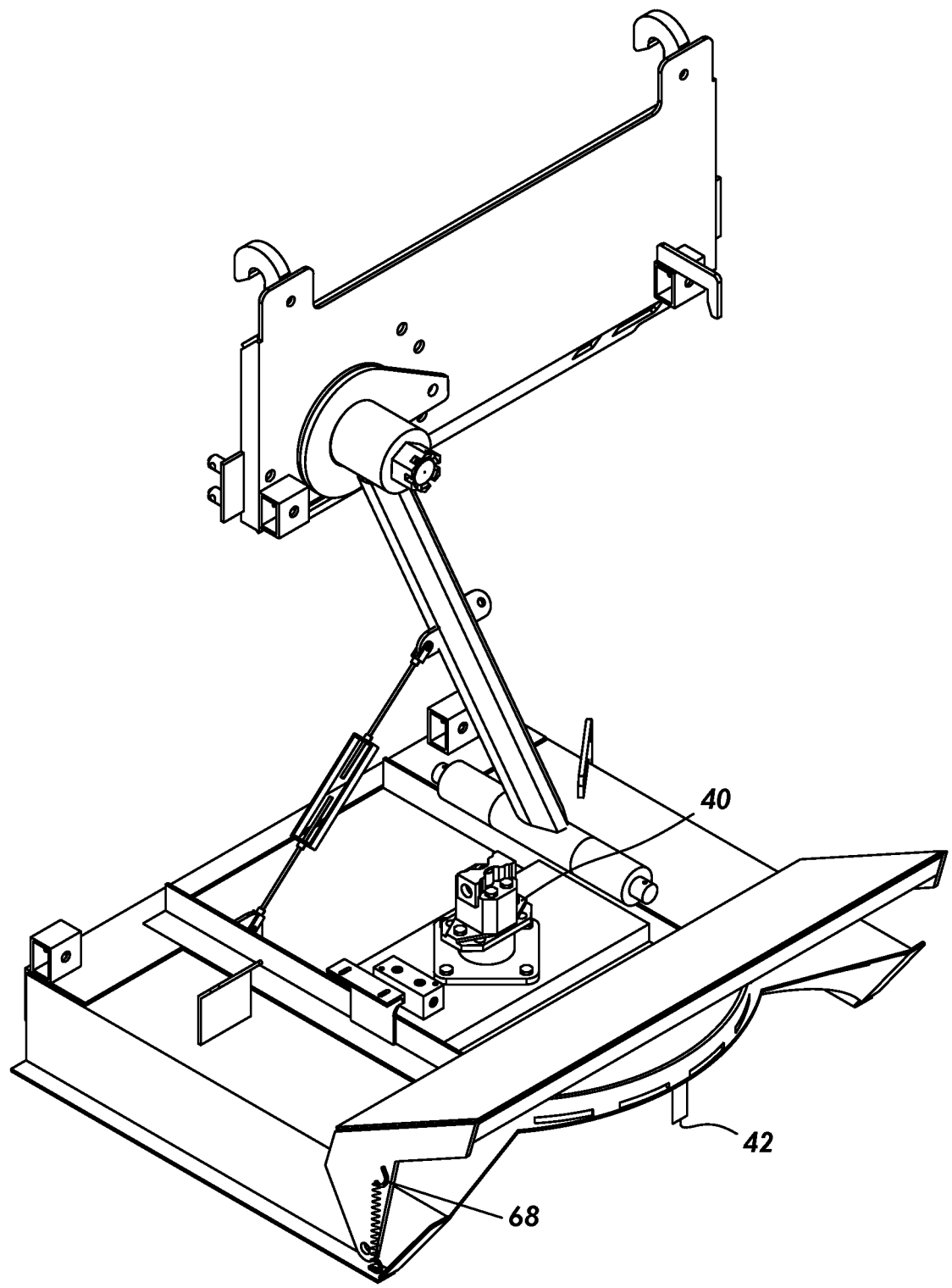
FIG. 4 is an isometric view of a brush cutter in a horizontally low deployed position in accordance with certain alternative embodiments of the present disclosure.

Mower deck 14 may include drive motor 40. Drive motor 40 may be coupled to mower deck 14 and may be operatively coupled to blade 42, as depicted in FIG. 4, such that blade 42 is rotated while drive motor 40 is active. Mower deck 14 may further include guard 60 adapted to contain debris such as grass, brush, limbs, and rocks encountered by blade 42 during use of brush cutter 10 below or behind mower deck 14, depending on the position of mower deck 14. In certain embodiments, guard 60 may be connected to mower deck body 62 at pivot point 64. The connection of guard 60 at pivot point 64 may be by pin 66, as a non-limiting example. In certain embodiments, as shown in FIG. 4, mower deck body 62 may be mechanically connected to guard 60 by biasing mechanism 68. As shown in FIG. 4, biasing mechanism 68 may be a spring. Biasing mechanism 68 may bias guard 60 from the open position shown in FIG. 4 to a closed position, thereby containing debris such as grass, brush, limbs, and rocks below or behind mower deck 14.

Figure 3:
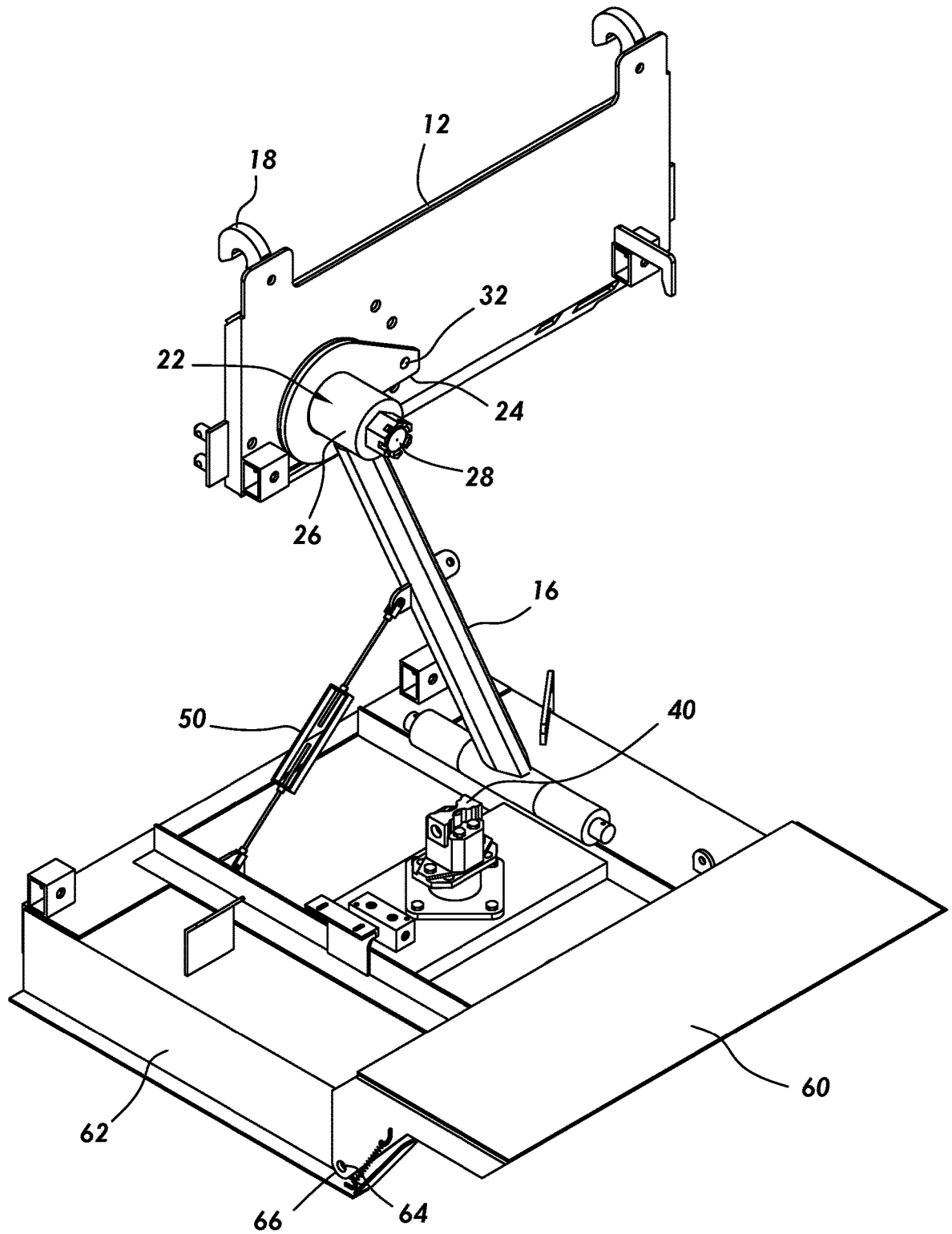
FIG. 3 is an isometric view of the brush cutter of FIG. 1 in a horizontally low deployed position.

In some embodiments, as shown in FIG. 3, angle adjustment arm 50 may provide another point of connection and support between angular arm 16 and mower deck 14. Angle adjustment arm 50 may include, in a non-limiting example, a turnbuckle. The position of mower deck 14 with respect to angular arm 16 may be adjusted through use of angle adjustment arm 50, such as by tightening or loosening the turnbuckle, thereby shortening or lengthening angle adjustment arm 50.

Mower deck 14 may be rotated from a horizontal position, as shown in FIGS. 1, 3, and 4, to a vertical position, as well as points thereinbetween, as shown in FIG. 6, by rotation of spindle 28, and, in certain embodiments, by adjustment of angle adjustment arm 50. This allows operation of blade 42 at any angle from 0° to 90° relative to the ground.

In operation, brush cutter 10 may be coupled to a vehicle such as, for example and without limitation, a tractor or skid steer tractor using retention hooks 18. Mower deck 14 may be positioned in the storage position as depicted in FIG. 1 for transportation until the vehicle reaches the desired area of operation. Mower deck 14 may then be moved to a desired position by, for example and without limitation, rotating mower deck 14 relative to angular arm 16 via hinge 30 and rotating angular arm 16 relative to back plate 12 using spindle arrangement 22. In some embodiments, the rotational position of spindle arrangement 22 relative to back plate 12 may be fixed using angular position retention devices 20 by, for example, inserting pin 32 through retaining plate 24 and retention devices 20.

During certain operations in which it is desired that the angle between mower deck 14 and angular arm 16 may vary during operation of brush cutter 10, angle adjustment arm 50 may be left uncoupled between angular arm 16 and mower deck 14. In other operations in which it is desired that the angle between mower deck 14 and angular arm 16 is fixed, adjustment arm 50 may be coupled between angular arm 16 and mower deck 14. By adjusting the length of adjustment arm 50, such as, for example, by rotating the turnbuckle, the angle between angular arm 16 and mower deck 14 may be adjusted as so desired.

Once mower deck 14 is positioned as desired, drive motor 40 may be activated. Drive motor 40 may rotate blade 42 such that blade 42 may be used to cut brush, grass, or other things. The vehicle may then be moved while brush cutter 10 is in operation.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A brush cutter comprising:
   a back plate, wherein the back plate comprises retention hooks and a plurality of angular retention devices, the angular retention devices being holes or detents;
   a spindle arrangement, the spindle arrangement abutting the back plate wherein the spindle arrangement includes:
   a retaining plate, the retaining plate abutting the back plate;
   a spindle collar, the spindle collar perpendicularly abutting and mechanically connected to the retaining plate; and
   a spindle, the spindle projecting through the spindle collar;
   an angular arm mechanically formed integrally with or mechanically connected to the spindle arrangement, the angular arm at angle Θ relative to the back plate, wherein angle Θ is an acute angle;
   a mower deck, the mower deck mechanically connected to the angular arm; and
   a blade, the blade mechanically connected to the mower deck.

2. The brush cutter of claim 1, wherein the angular arm is connected to the mower deck by a hinge.

3. The brush cutter of claim 1, wherein angle Θ is between 15° and 75°.

4. The brush cutter of claim 3, wherein angle Θ is fixed.

5. The brush cutter of claim 1, wherein the mower deck further comprises a drive motor, the drive motor operatively connected to the blade.

6. The brush cutter of claim 5, wherein the mower deck further comprises a mower deck body and a guard, the guard connected to the mower deck body at a pivot point.

7. The brush cutter of claim 6, wherein the mower deck further comprises a biasing mechanism, the biasing mechanism mechanically connected to the mower deck body and the guard.

8. The brush cutter of claim 7, wherein the biasing mechanism is a spring.

9. The brush cutter of claim 1, wherein the brush cutter further comprises an angle adjustment arm mechanically connected to the angular arm and the mower deck.

10. The brush cutter of claim 9, wherein the angle adjustment arm comprises a turnbuckle.

11. A method of operating a brush cutter comprising:
supplying a brush cutter, the brush cutter including:
   a back plate, the back plate including a plurality of angular retention devices;
   a spindle arrangement, the spindle arrangement abutting the back plate, the spindle arrangement including a retaining plate;
   an angular arm mechanically formed integrally with or mechanically connected to the spindle arrangement, the angular arm at angle $\Theta$ relative to the back plate, wherein angle $\Theta$ is an acute angle;
   a mower deck, the mower deck mechanically connected to the angular arm; and
   a blade, the blade mechanically connected to the mower deck; and
rotating the blade.

12. The method of claim 11, further comprising rotating the retaining plate with respect to the back plate.

13. The method of claim 11, wherein the brush cutter further comprises an angle adjustment arm mechanically connected to the angular arm and the mower deck.

14. The method of claim 11, wherein the mower deck further comprises a mower deck body and a guard, the guard attached to the mower deck body at a pivot point.

15. The method of claim 14, further comprising moving the guard from an open position to a closed position.

16. The method of claim 14, further comprising a biasing mechanism, the biasing mechanism mechanically connected between the guard and the mower deck body.

17. The method of claim 16, wherein the biasing mechanism moves the guard from the open position to the closed position.

18. The method of claim 11, wherein angle $\Theta$ is fixed.

* * * * *